(12) United States Patent
Sperry et al.

(10) Patent No.: US 6,561,236 B1
(45) Date of Patent: May 13, 2003

(54) INFLATABLE PACKING AND INFLATION APPARATUS

(75) Inventors: Laurence B. Sperry, Boston, MA (US); Eric A. Kane, Lynn, MA (US); Jesse S. Drake, Maynard, MA (US)

(73) Assignee: Sealed Air Corporation (US), Danbury, CT (US)

( * ) Notice: Subject to any disclaimer, the term of this patent is extended or adjusted under 35 U.S.C. 154(b) by 0 days.

(21) Appl. No.: 09/521,259

(22) Filed: Mar. 8, 2000

(51) Int. Cl.⁷ .............................. B65B 1/04; B65B 3/04; B67C 3/00
(52) U.S. Cl. ....................................... 141/314; 141/114
(58) Field of Search ................................ 141/114, 314; 137/223, 859; 206/522, 591; 383/3; 410/419

(56) References Cited

U.S. PATENT DOCUMENTS

| | | |
|---|---|---|
| 383,965 A | 6/1888 | MacKintosh |
| 1,213,518 A | 1/1917 | McEwen |
| 2,530,504 A | 11/1950 | Boyer |
| 3,398,501 A | 8/1968 | Aninger |
| 3,514,157 A | 5/1970 | Geiser |
| 3,733,005 A | 5/1973 | Frieder, Jr. |
| 3,808,981 A | 5/1974 | Shaw |
| 3,868,026 A | 2/1975 | Baxter |
| 3,877,719 A | 4/1975 | Lewis et al. |
| 3,889,743 A | 6/1975 | Presnick |
| 3,891,082 A | 6/1975 | Fall |
| 4,146,069 A | 3/1979 | Angarola et al. |
| 4,146,070 A | 3/1979 | Angarola et al. |
| 4,215,778 A | 8/1980 | Kovins |
| 4,240,556 A | 12/1980 | Field |
| 4,262,801 A | 4/1981 | Avery |
| 4,267,684 A | 5/1981 | Ambrose |
| 4,465,188 A | 8/1984 | Soroka et al. |
| 4,489,833 A | 12/1984 | Bauer |
| 4,569,082 A | 2/1986 | Ainsworth et al. |
| 4,573,202 A | 2/1986 | Lee |
| 4,597,244 A | 7/1986 | Pharo |
| 4,640,080 A | 2/1987 | Wright |
| 4,793,123 A | 12/1988 | Pharo |
| 4,872,558 A | 10/1989 | Pharo |
| 4,874,093 A | 10/1989 | Pharo |
| 4,877,334 A | 10/1989 | Cope |
| 4,892,124 A | 1/1990 | Thomsen |
| 4,905,835 A | 3/1990 | Pivert et al. |
| 4,917,646 A | 4/1990 | Kieves |

(List continued on next page.)

FOREIGN PATENT DOCUMENTS

| | | |
|---|---|---|
| DE | 40 30 919 A1 | 4/1991 |
| FR | 1253325 | 1/1961 |
| FR | 2 073 269 | 1/1971 |
| FR | 2456677 | 12/1980 |
| JP | 47-46063 | 12/1972 |
| JP | 54-58774 | 5/1976 |
| JP | 64-23488 | 2/1989 |
| JP | 10-129730 | 5/1998 |
| JP | 10-129731 | 5/1998 |
| WO | 85/00151 | 1/1985 |
| WO | 98/14390 | 4/1998 |
| WO | WO 99/52772 | 10/1999 |

OTHER PUBLICATIONS

Sealed Air Corporation product brouchre (VoidPak).

*Primary Examiner*—Timothy L. Maust
(74) *Attorney, Agent, or Firm*—Hale and Dorr LLP

(57) ABSTRACT

An inflatable packing article including a flexible, air tight bag; and a valve assembly defining a passage through which air is introduced into the bag during inflation, the valve assembly having an inlet end, the inlet end having an outer exposed surface with an adhesive adhered thereto and circumscribing a predefined area through which access to the passage is obtained.

16 Claims, 12 Drawing Sheets

U.S. PATENT DOCUMENTS

| | | |
|---|---|---|
| 4,918,904 A | 4/1990 | Pharo |
| 4,966,185 A | 10/1990 | Schram |
| 5,022,527 A | 6/1991 | Braeutigam |
| 5,042,541 A | 8/1991 | Krier et al. |
| 5,056,558 A | 10/1991 | Rodgers |
| 5,121,840 A | 6/1992 | Schram |
| 5,240,135 A | 8/1993 | Lepinoy |
| 5,272,856 A | 12/1993 | Pharo |
| 5,275,290 A | 1/1994 | Bierfreund |
| 5,288,188 A | 2/1994 | Vance |
| 5,335,486 A | 8/1994 | Davis |
| 5,339,602 A | 8/1994 | Landers et al. |
| 5,396,998 A | 3/1995 | Chaisson |
| 5,397,000 A | 3/1995 | Holte et al. |
| 5,454,407 A | 10/1995 | Huza et al. |
| 5,454,642 A | 10/1995 | De Luca |
| 5,552,003 A | 9/1996 | Hoover et al. |
| 5,651,237 A | 7/1997 | De Luca |
| 5,806,572 A | 9/1998 | Voller |
| 5,901,850 A | 5/1999 | Jones et al. |

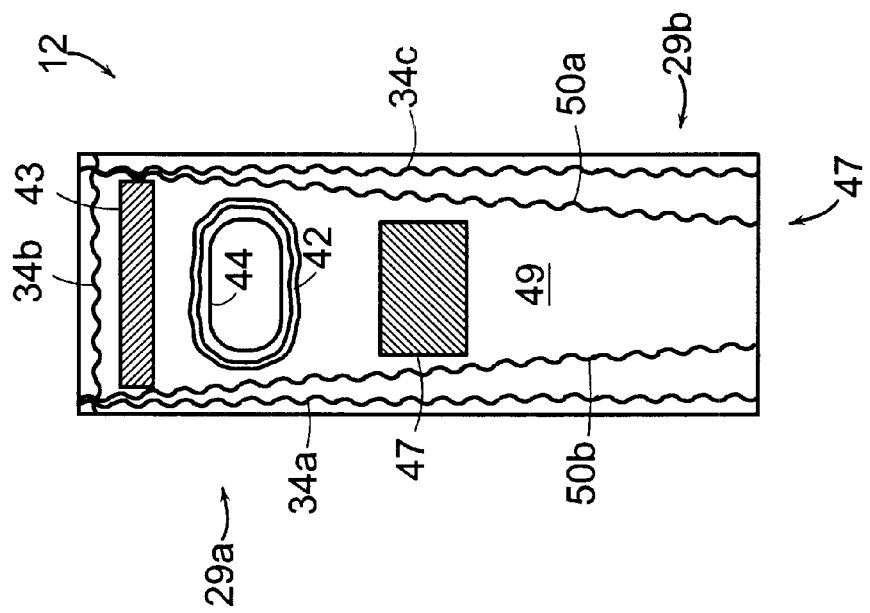
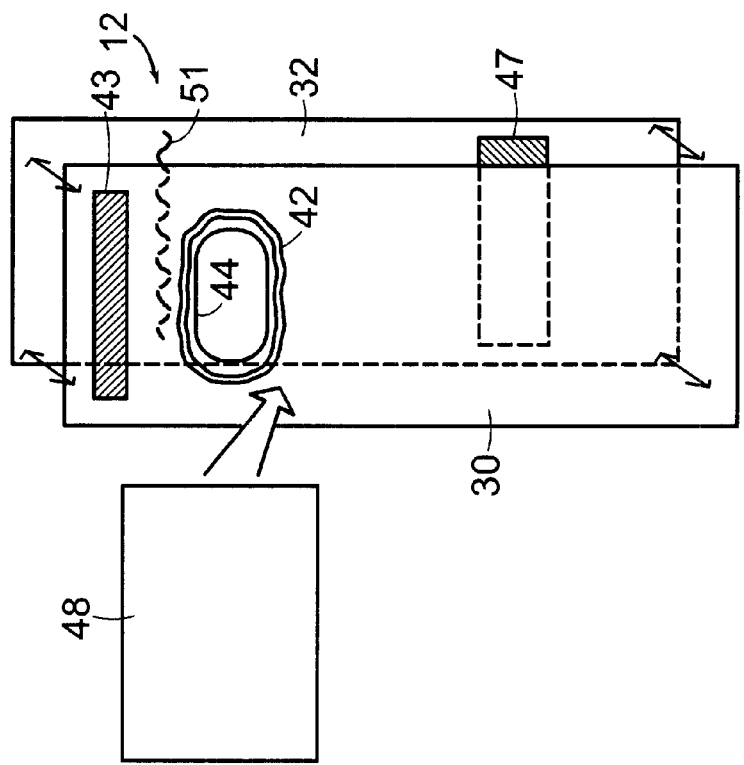
FIG. 2B
FIG. 2A

INFLATABLE PACKING AND INFLATION APPARATUS

BACKGROUND

The invention generally relates to inflatable dunnage bags and the equipment that is used to inflate such bags.

Boxes and other containers are commonly used to pack articles for shipment. It is frequently the case that a box must be selected that is larger than necessary. Thus, after the articles are packed into the box, there is still remaining empty space. If that space is not filled with something, the articles in the box will shift around during shipping. If the articles are fragile, as in the case of electronics equipment, they could easily be damaged during handling and shipping, especially given the rough treatment that they sometimes experience. But even in the case of articles that are not easily damaged, such as books, it is also desirable to not have those items bouncing around inside of the box. To solve this problem, various commercially available, fill materials are used to fill the empty spaces. Inflated or inflatable bags are examples of one category of fill material that is often used. These bags are sometimes also referred to as dunnage bags.

The inflatable bags come in various designs, shapes and sizes. Some of them are filled prior to placing them into the boxes as fill material. Others are filled after they are placed in the box. Of course, the advantage of the latter type is that they can be inflated just enough to fill all of the empty space that is present. Even though there is a great variety of inflatable bags that is available, there is always room for improvement in their design so as to reduce cost and increase their ease of use.

SUMMARY

In general, in one aspect, the invention features an inflatable packing article that includes a flexible, air tight bag; and a valve assembly defining a passage through which air is introduced into the bag during inflation. The valve assembly has an inlet end, which has an outer exposed surface with an adhesive adhered thereto and circumscribing a predefined area through which access to the passage is obtained.

Other embodiments of the invention include one or more of the following features. The adhesive is distributed around the predefined area in a continuous line or alternatively in a discontinuous manner. The inflatable packing article also includes a release material covering and protecting the adhesive. The inlet end of the valve assembly has a hole formed therein and wherein the adhesive circumscribes the hole. The valve assembly includes a flexible valve which allows air into the bag during inflation and prevents air from escaping from the bag when the bag is inflated. The valve assembly has an internal passage for allowing air to flow into the bag and includes no orifice into the internal passage from outside of the bag. The valve assembly is made of a flexible material, e.g., linear, a low-density polyethylene material.

Other features found in some embodiments are the following. The valve assembly extends out of one end of the bag and the inlet end of the valve assembly is in the form of a tether. The bag has an outer wall and a part of the valve assembly is formed by a portion of the wall of the bag. The bag has an outer wall with a hole defining the inlet of the valve assembly, and the adhesive is applied to the outside of the outer wall of the bag around the hole formed therein. The valve assembly is completely inside of the bag.

The various embodiments of inflatable bags which embody aspects of the invention have one or more of the following advantages. The inflatable bag is easy to install. The boxes and containers into which it is placed need not have pre-punched inflation holes. The flexible valve assembly uses a minimal amount material to construct and thus is less expensive than other alternatives commonly used. No portions of the valve need to protrude outside of the container or be in such close proximity to the outside wall surface of the container that they can be snagged or damaged by other articles coining into contact with the filled container. The hole that is produced in the side of the container is smaller than the holes that are required for other prior art systems.

In general, in another aspect, the invention features a method of filling empty space inside of a container. The method includes placing an inflatable bag in the empty space within the container; adhering a portion of the inflatable bag to a predetermined location on an inside wall of the container; after placing the bag in the container, puncturing the wall of the container at the predefined location; and injecting a gas through the puncture hole in the wall of the container to fill the inflatable bag.

Other embodiments of the invention include one or more of the following features. The the portion of the inflatable bag that is adhered to the inside wall of the container is an inlet part of a valve. The inlet part of the valve has a hole preformed therein and the step of injecting involves injecting the gas through the preformed hole in the valve.

In general, in yet another aspect, the invention features an apparatus for filling, an inflatable bag within a container. The apparatus includes a inflator head the having a front face and a passageway for transporting a gas therethrough; a nozzle mounted on and extending away from the front face of the inflator head; and a mechanical drive unit that during operation moves the inflator head between an extended position and a retracted position.

Other embodiments of this aspect of the invention include one or more of the following features. The nozzle has a shape that tapers down to a tip, e.g. a wedge shape. The apparatus also includes a gasket mounted on the front face of the body and circumscribing the nozzle mounted thereon. The nozzle has a plurality of holes through which the gas from the internal passage is directed out of the nozzle during operation.

In general, in yet another aspect, the invention features a handheld apparatus for filling inflatable fill bags within a container. The handheld apparatus includes a tapered inflation nozzle tapering down to a smaller tip; a base unit on which the nozzle is mounted; and an alignment guide which defines two different surfaces each at a corresponding predefined distance from the nozzle. The base has an air supply passage in communication with the air supply conduit of the nozzle, and it has a handgrip and an input connector for connecting to an air supply hose In other embodiments of the invention the base has a front surface into which the nozzle is mounted and a gasket mounted on the front surface and circumscribing the nozzle. The base unit includes an air flow control valve which controls air flow through the internal air supply passage to the conduit in the nozzle and it includes a control button for operating the flow control valve. In addition, the alignment guide defines a corner of a cubic surface.

In general, is still yet another aspect, the invention features an apparatus for inflating an inflatable bag in a container having a top. The apparatus includes an inflator head the having a front face and a passageway for delivering gas for inflating the inflatable bag and a mechanical drive unit that during operation moves the inflator head between an extended position and a retracted position, the mechanical drive being supported on and pivotable about an axis; and it includes a transducer arranged to generate a signal that is a measure of a degree of rotation of the drive unit about said axis.

Other embodiments include a processor programmed to determine an amount of swell of the top of the container from the signal generated by the transducer.

The various embodiments of the inflation systems that are used to inflate the inflatable bags have one or more of the following advantages. The boxes and other containers that are used with the system need not be altered for use with the systems. The handheld device is particularly convenient and easy to use.

DESCRIPTION OF DRAWINGS

FIGS. 2A and 2B shows the construction of the flexible valve assembly that is shown in FIG. 1;

FIG. 8A shows the pivot mechanism and the biasing element used to hold the cylinder shown in FIG. 8 in a home position;

FIG. 12A shows details of certain aspects of the design of the unit shown in FIG. 12;

DETAILED DESCRIPTION

The Inflatable Bag

Figure 1:
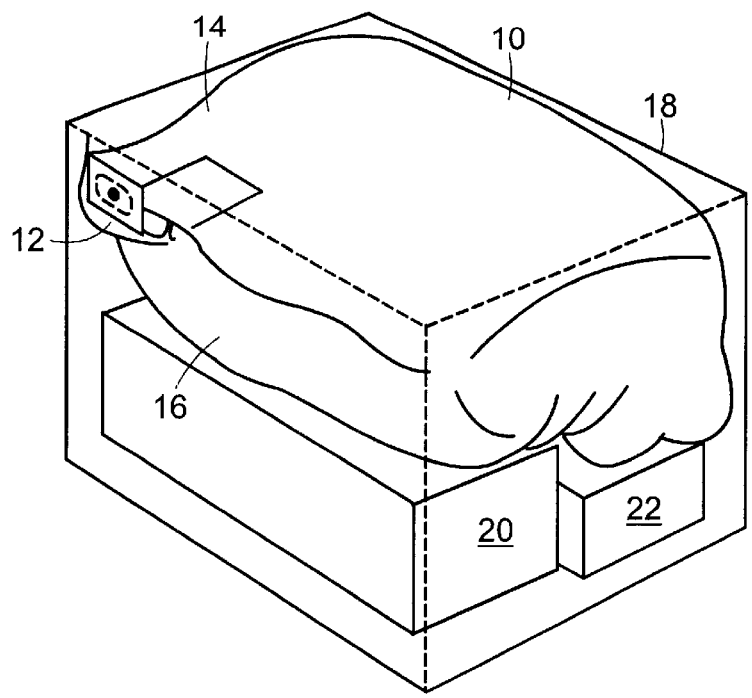
FIG. 1 shows a container with an inflatable bag filing the empty space above the articles carried by the container.
Figure 3:
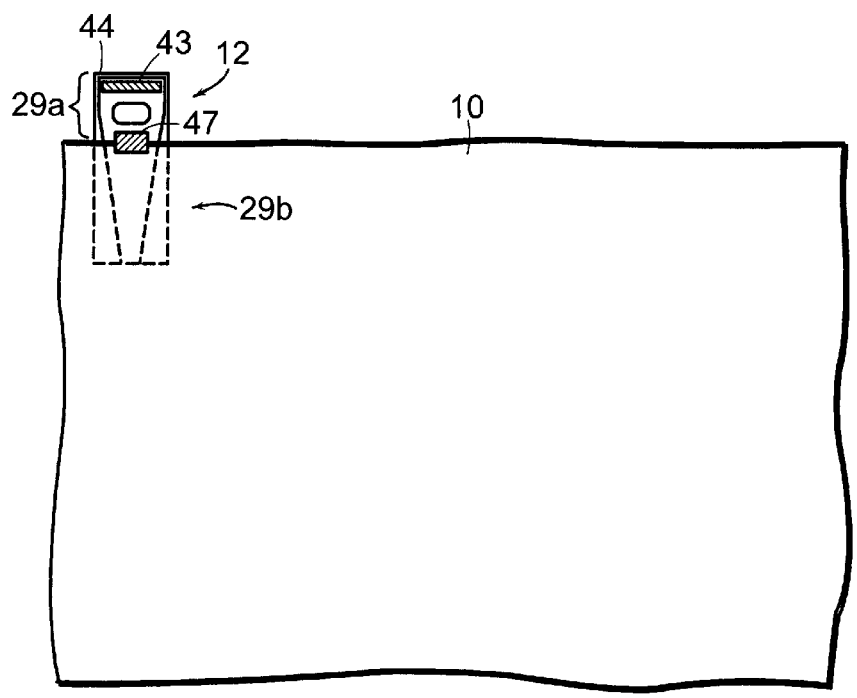
FIG. 3 shows an example of an inflatable bag before it is inflated.

Referring to FIG. 1, one embodiment of the invention is an inflatable dunnage bag 10 that has a flexible valve assembly 12 near one corner of the bag and through which the bag can be inflated with air. The bag is typically used in a package or box 18 to fill the empty space that is above articles 20 and 22 that are being shipped in the box. The bag has a front side 14 and a backside 16 and when inflated it takes the shaped of a pillow. In the box, the bag fills the empty space and conforms to the articles in the box, thereby preventing them from shifting around during shipping and providing the added advantage of increasing the integrity and stacking strength of the box.

Both inflatable bag 10 and its flexible valve assembly 12 are typically made from a pliable, sealable material, for example, linear, low-density polyethylene. They can also be made from other appropriate materials including medium or high-density polyethylene. In addition, inflatable bag 10 can have multiple layers. For example it can have a polyester or nylon outer layer, for strength and abrasion resistance, and a low-density polyethylene inner bag for heat sealability. Typically the bag itself is made of a thicker material than is used for the flexible valve assembly. For example, the polyethylene used for the bag walls might be 2–3 mils thick; whereas the polyethylene used for the flexible valve assembly might be about 1 mil thick. The bags tend to receive considerable abuse during shipping of articles and thus the wall material should be sufficiently thick to withstand that abuse without rupturing. In contrast, the valve assembly does not receive as much abuse and can thus be made of a thinner material. Indeed, a thinner material tends to produce a flexible valve that operates more effectively in terms of sealing and preventing the leakage of air out of the bag through the valve.

In the described embodiment, the main body of the bag is formed from a flattened tube of the polyethylene material. A section of appropriate length is cut off of the flattened tube. Flexible valve assembly 12 is inserted in one of the open ends of the tube and then the two open ends of the tube are sealed together using heat in a manner well know to those skilled in the art. One portion of valve assembly 12, which shall be referred to as input end 29a, lies outside of the bag, and the other portion of the valve assembly, which shall be referred to as flexible valve 29b, lies inside of the bag. In this embodiment, input end 29a serves as a tether that makes it easier to install the bag and to arrange it as desired within the box.

It should, of course, be understood that there are ways of manufacturing the bag other than from tube stock, as just described. For example, it could be made from two individual sheets of material heat sealed together on all four sides, or it could be made from center-fold material (i.e., a sheet folded at the center) which is heat sealed on the three open sides.

Referring to FIGS. 2A and 2B, flexible valve assembly 12 is made of two narrow pieces (i.e., a front wall member 30 and a back wall member 32) of the polyethylene material heat sealed together along the two opposed long edges 34a and 34c and along one end 34b. On input end 29a of valve assembly 12, there is an oblong-shaped hole 44 in the front wall member 30 and through which air can be flowed into the bag to inflate it. The valve mechanism itself lies between hole 44 and the lower end of the valve assembly, designated in FIG. 2B by numeral 47. The valve mechanism is typically formed by producing a narrower passageway 49 from hole 44 to end 47. This is done by heat sealing the front and back wall members 30 and 32 together along two strips 50a and 50b. In the illustrated embodiment, this produced a funnel-shaped passage that decreases in width from hole 44 to end 47. Of course, the illustrated design of the passage is merely meant to be illustrative of one of many possibilities for designing the passageway. Examples of other designs are readily available in the art (see, for example, U.S. Pat. No. 5,830,780 entitled "Self-Closing Valve Structure" and incorporated herein by reference).

Normally, the two sides of the valve formed by front and back wall members 30 and 32 are in contact with each other and the air passageway is closed. Air blown into hole 44 opens up passageway 49 and flows into the bag and inflates it. When air injection is stopped, the two walls of the passage tend to naturally come back together, thereby closing passageway 49 and preventing air from escaping back through the valve. The back pressure from the inflated bag aids in sealing the passageway by pushing the two walls defined by front and back wall members 30 and 32 together.

The inside of back wall member 32 has a patch of ink 47 printed onto it below oblong hole 44 and at the point that the heat seal will cross the valve assembly when the end of the bag is sealed together, as mentioned above. The purpose of the patch of ink is to prevent the two wall members 30 and 32 of the valve assembly from adhering to each other where the passageway will be located and thereby blocking the passageway. In other words, the patch of ink keeps the passageway open during the heat sealing operation. This technique for preventing the two pieces from being heat sealed together is well known to persons skilled in the art.

The front wall member 32 also includes an alignment bar 43 printed on its surface above the location of hole 44. As will be described below, this alignment bar 43 helps the person who is attaching the valve assembly to the inside wall of the container to place the hole at the proper location for the subsequent fill operation.

After the valve assembly has been incorporated into the inflatable bag, a continuous line of a sticky glue 42 is applied to the polyethylene around the outside perimeter of oblong-shaped hole 44. This glue is used to attach the valve assembly to an inside wall of the container into which the bag is being placed. To prevent the glue from inadvertently adhering to other surfaces while being stored or while being handled, there is a rectangular piece of release paper 48 covering the glue and protecting the glue. The glue is a tacky, pressure sensitive, hot melt glue that easily adheres to the inside of the container, e.g. a cardboard. In the described embodiment, the glue is HM 1597 manufactured by H. B. Fuller, though other glues could also be used. Its characteristics are that it should adhere well to the material of which the valve assembly is made (e.g. the polyethylene), it should maintain its sticky quality so that it will adhere well to the inside of the packing box when it is time to apply it to the box wall, and it should provide a bond that is sufficiently strong so as to prevent the valve assembly from being detached from the inside wall of the container during the inflation operation.

Though we have described using a continuous line of glue around the valve opening, the glue line need not be continuous. It can be an array of glue dots distributed around the valve opening and sufficient in number to hold the valve face onto the container during the puncture and fill operation. The injection of air can be made aggressive enough that the air leakage that occurs due to not using a continuous glue line will not significantly affect the fill operation. The primary requirements of the glue that is applied is that it hold the valve opening against the inside wall with sufficient strength that it does not detach during the fill operation. One could use as few as two lines of glue or three dots spaced evenly around the perimeter of the valve opening.

When it is time to use the bag for its intended purpose, the worker removes release paper 48 from the valve assembly, and presses the glued surface against the inside of the container at a predetermined location. The container is then closed and taped shut. After that the user, employing a special air fill device, the details of which will be provided shortly, punctures the outside of the container and injects air into the bag until the bag is filled.

When the air fill device punctures the wall of the container at the predetermined location, it enters trough the oblong-shaped opening 44 defined in the front face of the flexible valve assembly. With the injector held in position, air is injected through the nozzle, through the valve assembly and into the inflatable bag. The seal holds the front face onto the inside wall of the container preventing it from detaching under the force of the injected air.

Referring again to FIGS. 2A and 2B, in the described embodiment, glue 42 is applied close to the perimeter of the hole 44 so that a portion of flexible material 30 lies between glue 42 and the heat seal stripes 34a and 34c that define the outer edge of the valve assembly. In other words, the glue line is not allowed to extend out to the heat seal stripes 34a and 34c.

Figure 4A:
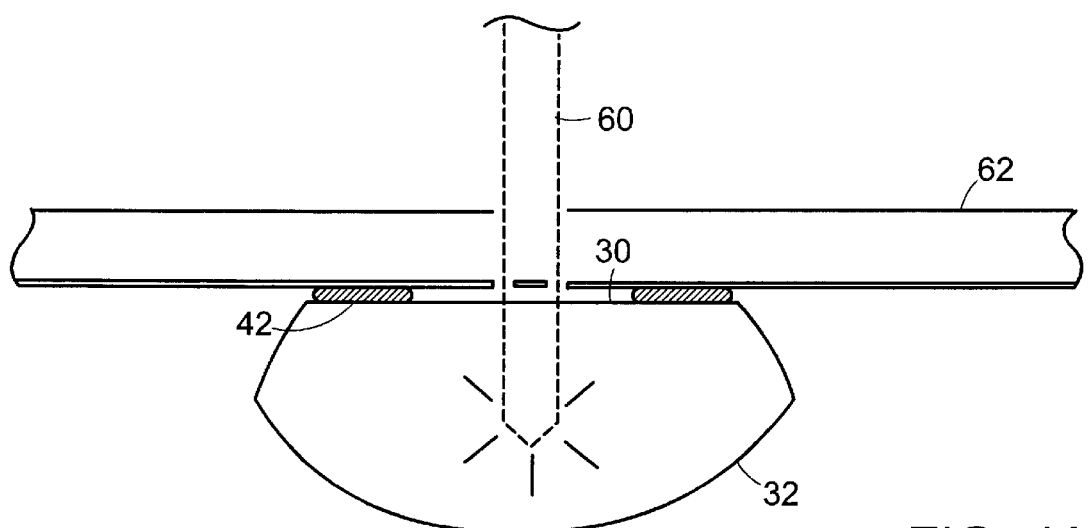
FIG. 4A illustrates the benefits of placing the glue line away from the outer edges of the valve assembly.
Figure 4B:
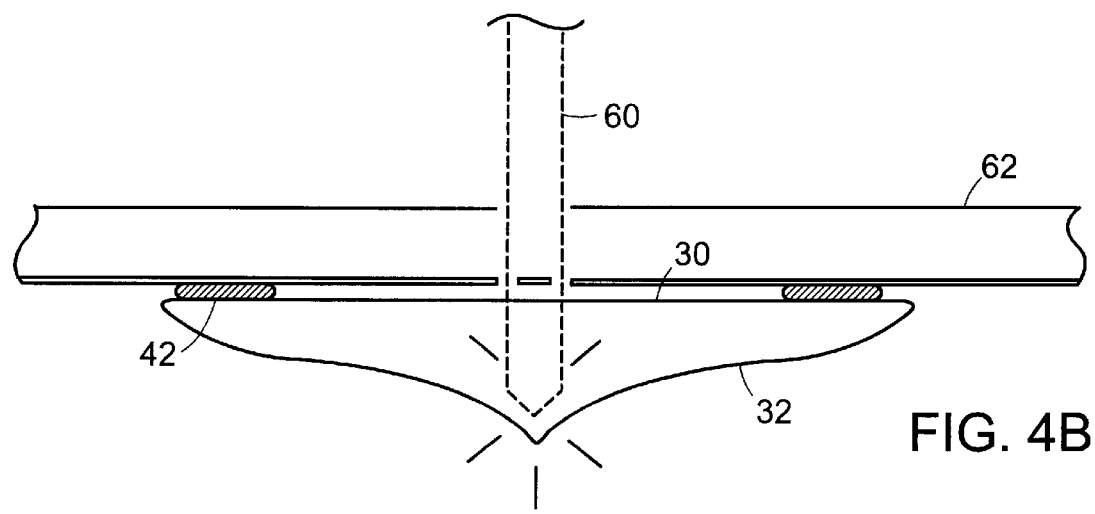
FIG. 4B illustrates the results of placing the glue line at the edges of the flexible valve assembly.

The advantage of placing the glue line in this manner can be more fully appreciated with the aid of FIGS. 4A and 4B. If glue line 42 is applied out near the edge of the valve assembly, as defined by the heat seal stripes 34a and 34c, then both front and back wall members 30 and 32 of the flexible material will tend to be held tightly against the container wall. Thus, when the injector nozzle, as illustrated by the dashed line 60, penetrates through the container wall 62, and passes through the oblong hole it will hit back wall member 32. Since back wall member 32 is being held tightly against the container due to the placement of the glue line, there is the possibility that inflator tip 60 will also pierce the wall member 32. If that happens, the air injected through the inflator tip, instead of going through the valve into the inflatable bag will go into the interior of the box and fail to inflate the bag.

In contrast, by keeping glue 42 away from the edges of the valve assembly, the flaps of wall material 30 that lie outside of the glue line will act as hinges that allow the back wall 32 to be pushed away from the container wall when the inflator tip contacts it. In other words, rather than piercing the back wall 32, the tip will simply push it away from wall 62 of the container as indicated in FIG. 4A.

Figure 5:
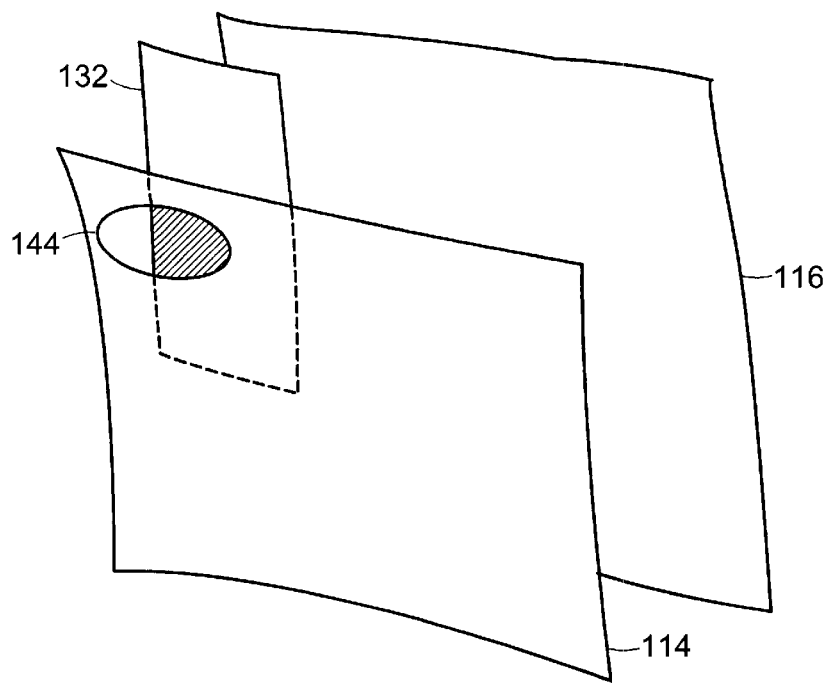
FIG. 5 shows an alternative embodiment of an inflatable bag.

An alternative embodiment of the inflatable bag is shown in FIG. 5. In this embodiment, one side of the bag is also used as one part of the valve assembly. That is, the valve assembly is an integral part of one wall of the bag. As shown, there is a front wall member 114, a back wall member 116, and a much narrower valve wall member 132. An oblong-shaped hole 144, which serves as the valve opening, is cut in front wall member 114.

Figure 5A:
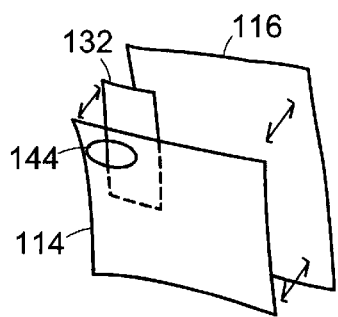
FIGS. 5A–C illustrate the steps in assembling the inflatable bag of FIG. 5.
Figure 5B:
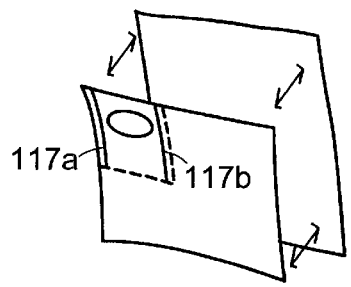
Figure 5C:
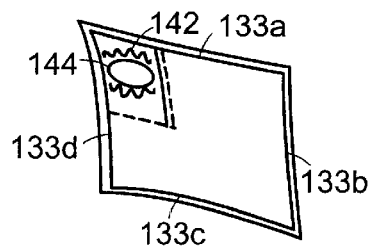

Referring to FIGS. 5A–C, to assemble this bag, the front wall member 114 with hole 144 cut into it is aligned with valve wall member 132 and the two are heat sealed together along lines 117a and 117b so as to form the valve passageway. Next, front wall member 114 is aligned with back wall member 116, and those two pieces are heat sealed together around their perimeter (see lines 133a–d). The adhesive 142 is applied to the outside of front wall member 114 around hole 144 formed therein.

In still other embodiments of the inflatable bag, the oblong-shaped hole is omitted. Instead, the glue line is deposited around the perimeter of an are through which a hole will later be formed. When the front member is glued onto the inside wall of the container, the area of the front piece that is surrounded by the glue will be held tightly against the wall. When the inflator nozzle pierces the wall, it will also pierce the front member and thereby create its own entrance into the internal air passage of the valve assembly. Of course, in this case, it is desirable to make the front member of a material that breaks easily and does not easily elongate so that the inflation nozzle can easily pierce the material to form the entrance into the valve assembly. Whereas the back member, as was previously the case, should be made of a material that elongates easily and has a high dart strength, i.e., breaks with difficulty.

In yet other embodiments, the valve assembly incorporates a rigid valve, such as is described in U.S. Ser. No. 09/140,522, entitled "Inflatable Packing Material and Inflation System," incorporated herein by reference. In other words, there is no reason why the technique described herein cannot be used with any type of valve assembly that lends itself to being used with an inlet design having a face member that can be glued to the inside surface of the container in which the inflatable bag is inserted.

Figure 6:
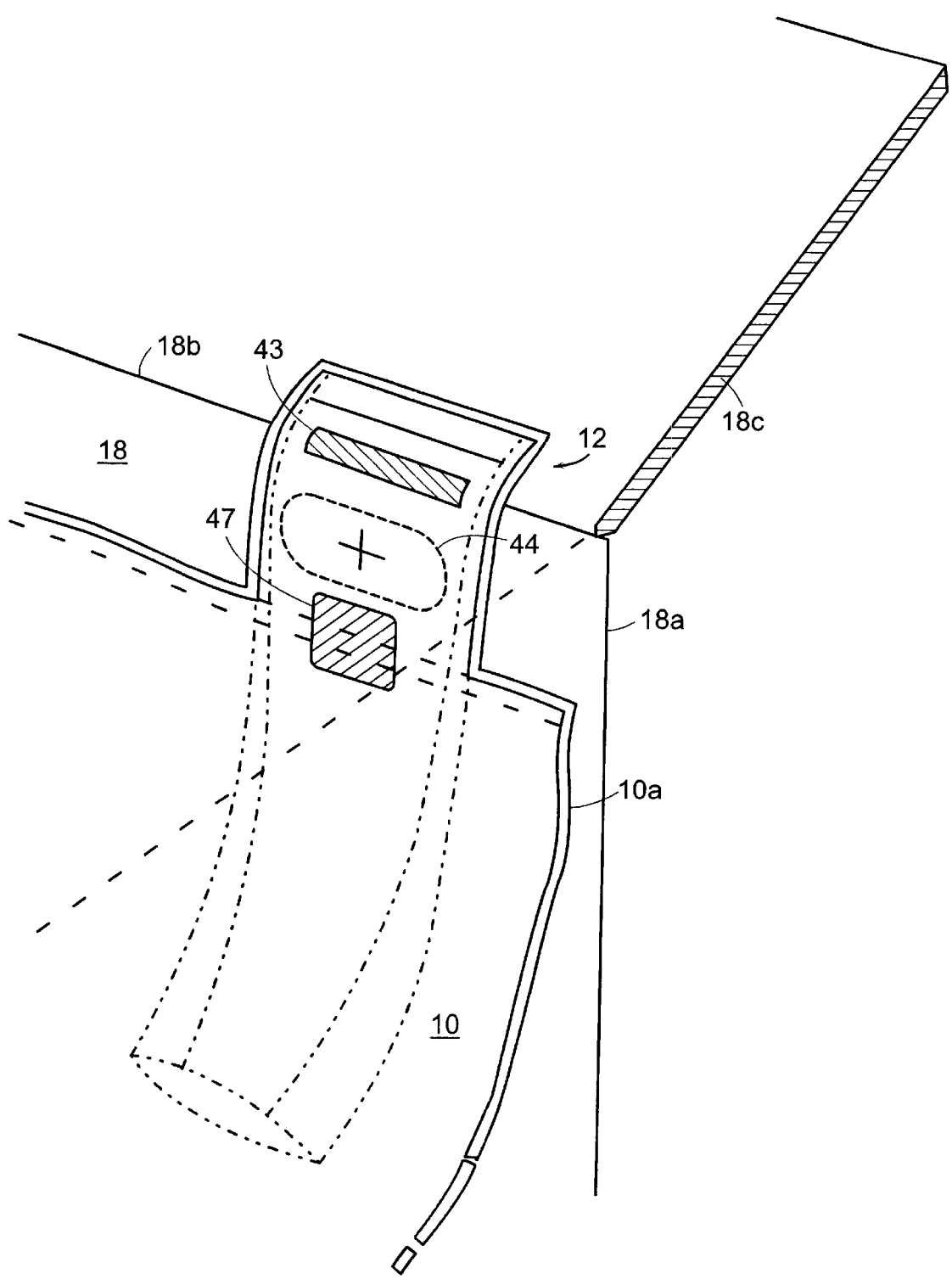
FIG. 6 illustrates how the valve assembly is aligned properly within the box.

When the inflatable bag is placed within a container or box, the tether (or input end 29a of valve assembly 12) is attached to the inside of the box with the hole 44 aligned on the spot that will be pierced during the inflation operation. Referring to FIG. 6, the edge 10a of bag 10 and alignment mark 43 on valve assembly 12 may be used to properly align and place the valve. To use these two alignment guides in this way, valve assembly 12 and hole 44 are positioned an appropriate distance from edge 10a of bag 10 so that when edge 10a is aligned with the inside corner 18a of box 18, valve opening 44 will be a predetermined distance from the side edge of the box. In addition, alignment mark 43 is placed a predetermined distance above hole 44 of valve assembly 12. So by aligning alignment mark 43 with the top edge 18b of the box, hole 44 is placed a known distance from top edge 18b. By choosing the distances appropriately, hole 44 can be placed at the precise location that will be pierced by the inflation nozzle during the inflation operation simply by aligning bag edge 10a and alignment mark 43 with side edge 18a and top edge 18b of box 18.

During the air injection phase, the jet of air into the valve assembly exerts a force on the valve that works to detach the valve from the inside wall. If the air injection rate is set too high or the valve face is not attached firmly enough, that force will cause the valve to detach and the fill operation will fail. Referring to FIG. 2A, to reduce the force that is exerted on the valve without reducing the rate of air flow into the bag, slits or flaps 51 may be cut in the back wall 32 of the valve assembly at a location opposite the valve opening. The slits or flaps allow some of the air to pass through the back thus reducing the fore component in the direction away from the wall and also reducing the tendency of the injected air to detach the valve from the inside of the box. By relieving some of the force caused by air injection, slit or flap 51 may enable one to use a less expensive glue or lower performance glue.

Though we have described a bag having a particular construction, we do not mean to imply that the invention is limited to bags of that design. It can be used with any inflatable bag that is inflated with fluid, especially air. In addition, the bag and the valve assembly can be made of other appropriate materials.

The Inflation System

Figure 7:
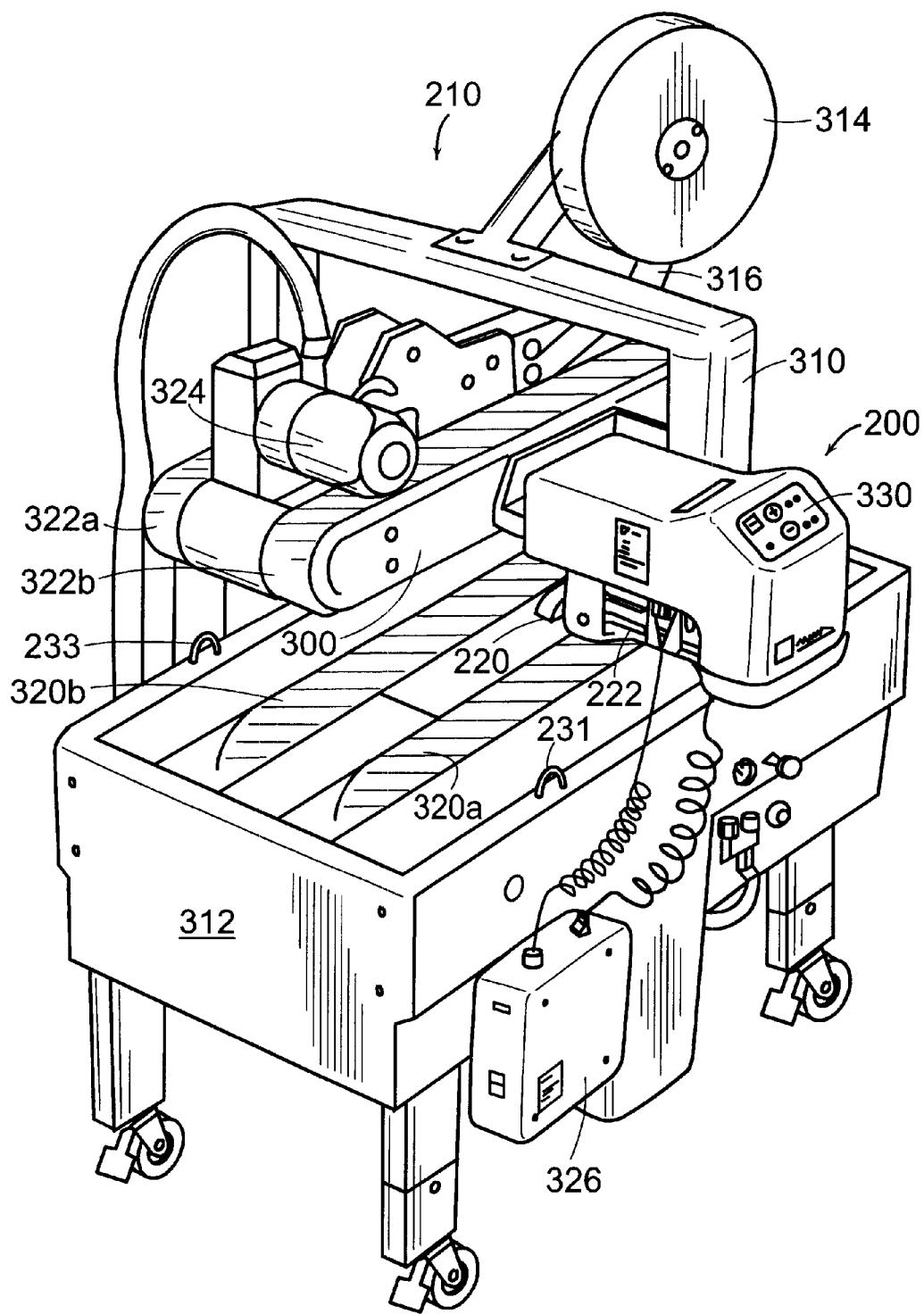
FIG. 7 shows a taping machine that also includes an inflator system that is used to inflate the inflatable bags illustrated in previous figures.

An inflator system that can be used to inflate the bags that were described above is illustrated in FIG. 7. In this embodiment, an inflator unit 200 is mounted onto a taping machine 210 so that the inflatable bag that was placed in the box can be inflated soon after the box has been taped shut. Taping machines are commercially available and come in many different designs. In general, the inflator system can be adapted to work with any of them given proper modifications to the systems. For purpose of illustration, we have selected but one example of the possible designs.

The machine includes an automatic taping head assembly 300 that rides up and down on a supporting frame 310 that is attached to a base unit 312. Taping head assembly 300 adjusts in its vertical position to the height of the box so that this machine can accommodate different height boxes without much difficulty. There is a tape cartridge 314 mounted on the top of the supporting frame that holds a supply of tape and delivers that tape to the taping head assembly during the taping operation. Inflator unit 200 is mounted on one side of taping head assembly 300. Thus, inflator unit 200 also rides up and down with taping head assembly 300 as the assembly adjusts to the height of the box (not shown) that is being taped. Attached to the underside of inflator unit 200 is an inflator mechanism 227 that is the operational part of the inflation system. Further details about the inflator mechanism are presented below.

Base unit 312 includes two free wheeling conveyor belts 320a and 320b that allow the box to easily slide through the system. Taping head assembly 300 includes two powered conveyor tracks 322a and 322b that rest on the top of the box during the taping operation and push the box through the system. These two conveyor tracks are driven by a drive motor 324 that is also mounted on taping head assembly 310. A processor-based control system, represent by control box 326, starts and stops the conveyor system in response to control signals received from inflator unit 200 and from elsewhere. Power is supplied to the inflator unit through a power cord that is connected to a control box. Similarly, pressurized air is supplied to inflator unit through a hose that also connects to the control box. Inflator unit 200 includes a control panel 330 through which the user can, among other things, manually operate the unit and run diagnostics on it.

The taping machine includes an edge detector (e.g. a light source 231 and light detector 233 on opposite sides of the conveyor) that indicates when the box has reached a predetermined location. The control system uses that detection signal to stop the conveyor and initiate the inflation operation.

Figure 8:
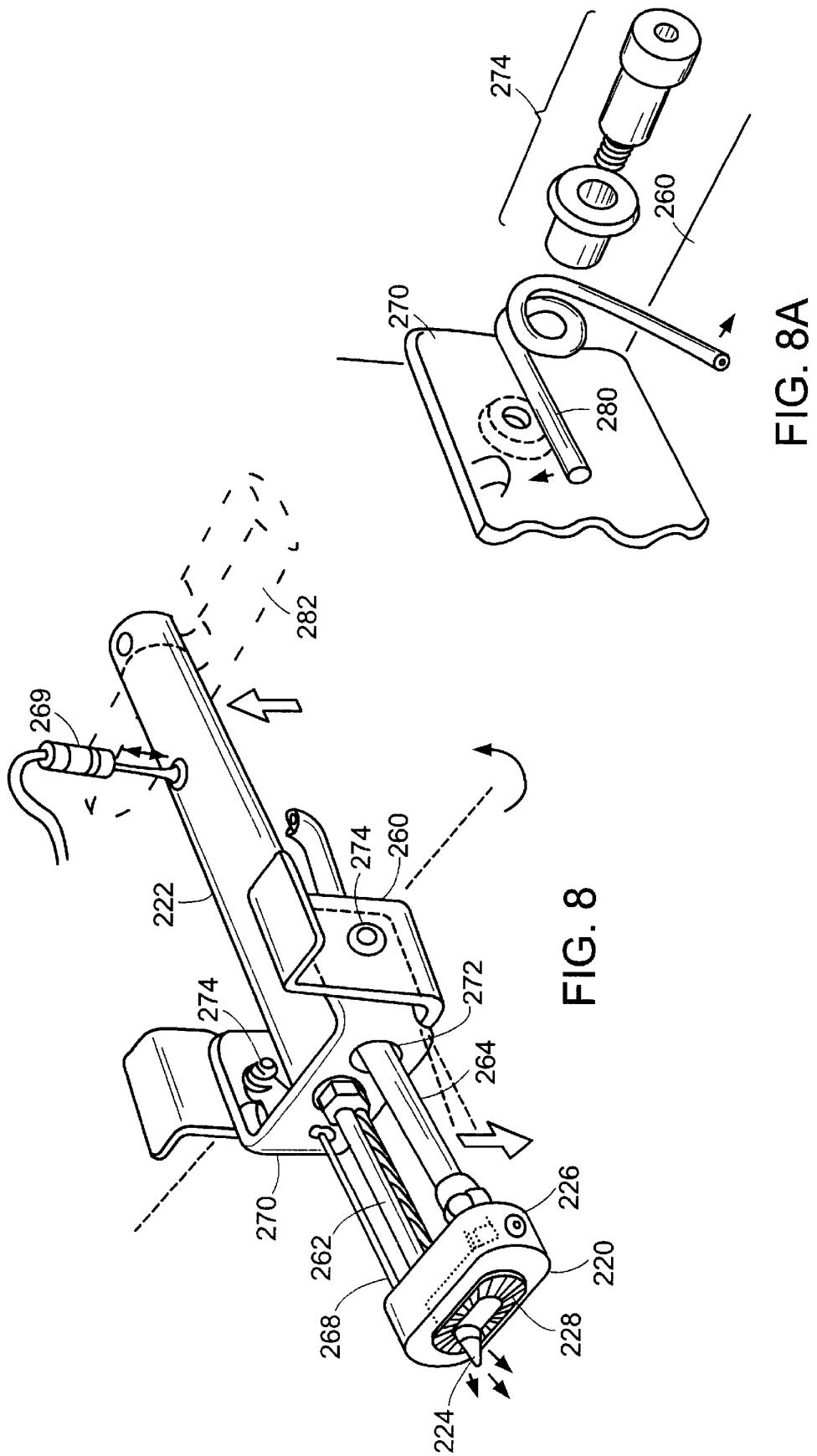
FIG. 8 shows the inflator system that is attached to the taping machine of FIG. 6.

Referring to FIG. 8, inflator system 200 includes a pneumatically operated cylinder 222 that is pivotally mounted onto taping machine 210. Cylinder 222 has a movable shaft 262 that can be extended out of the cylinder and retracted into the cylinder under control of pressure supplied to a control inlet (not shown). Inflator head 220 is mounted on the end of shaft 262. An air supply hose 264 is coupled to the backside of inflator head 220 and supplies the air flow used to inflate the bag. The front of cylinder 222 is mounted on a U-shaped support bracket 270 which includes a hole 272 through which the air supply hose passes. Hole 272 is sufficiently larger than the diameter of the air supply hose so that the hose can easily move through the hole without risk of getting hung up. U-shaped support bracket 270 is pivotally mounted to the U-shaped mounting bracket by two pivot assemblies 274, one of which is shown more clearly in FIG. 8A. Support bracket 260 is, in turn, attached to the underside of the inflator assembly, which is in turn mounted to the side of the taping head. Thus, the inflator assembly rides up and down with the taping head.

A spring 280 connected between the two support brackets 260 and 270 biases the cylinder so that it is horizontal and the inflator head is at its highest position relative to the taping head on which the inflator assembly is mounted. There is a stop bar 282 at the back of the unit against which the body of cylinder 222 is biased by spring 280. The pivots enable the inflator head to move downward, thus increasing the space between the inflator tip and the taping head. This is useful because as the bag inflates, the top of the box will bow upwards, increasing the distance between the top of the box and the hole that is punched in the side of the box by the inflator nozzle.

Figure 9:
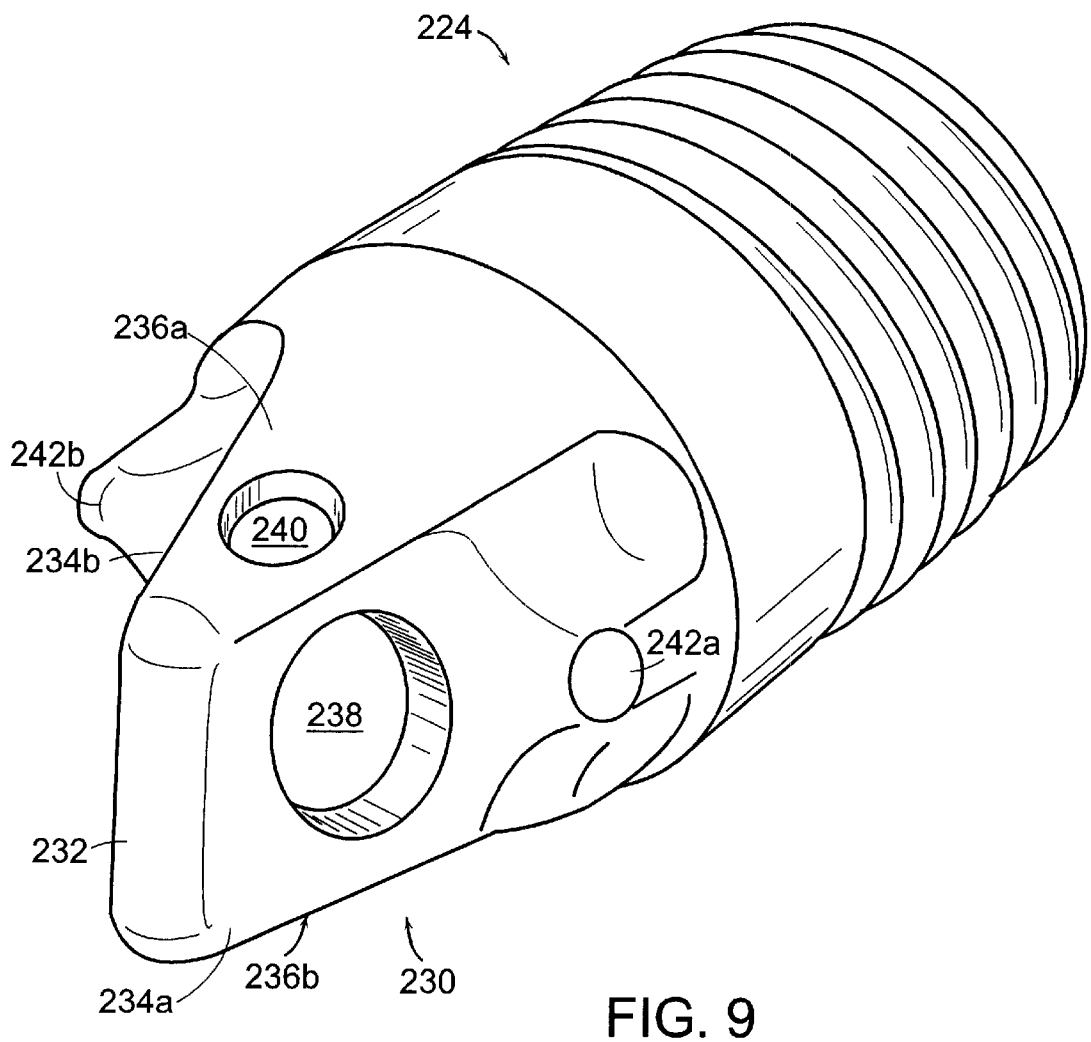
FIG. 9 shows a detailed view of the wedge-shaped nozzle.

Still referring to FIG. 8, inflator head 222 includes a wedge-shaped nozzle 224 that is screwed into an inflation cup 226. Surrounding nozzle 224, there is an oval-shaped gasket 228 made of a compressible material. Nozzle 224, which is shown separately and in greater detail in FIG. 9, has a central passage (not visible in the figure) that extends from the back end and terminates before reaching a wedge-shaped portion 230 at the front of the nozzle. Wedge-shaped portion 230 terminates at a tip 232 that has a narrow, elongated profile. Wedge-shaped portion 230 is defined by sloping sidewalls 234a and 234b on either side and by non-sloping sidewalls 236a and 236b on the top and bottom of the nozzle. There is a hole 238 formed through sloping sidewall 234a and extending into and communicating with the internal passage within the nozzle. A similar hole, which cannot be seen in FIG. 9, is located in sidewall 234b on the other side of the nozzle. There is also a smaller hole 240 formed in the top non-sloping sidewall 236a which also extends into and communicates with the internal passage. The opposite non-sloping side wall 236b, which is not visible in FIG. 9, includes a similar hole. At the base of each sloping sidewall 234a and 234b, there is a shoulder 242a and 242b extending out from the sidewall and adjacent to the back rim of the hole in that wall.

The narrow portion of elongated tip 232 is sized to fit between the vertical corrugations or flutes that typically characterize the internal wall structure of cardboard boxes that are used to package items. If the tip hits the wall of the box with sufficient force, the tip will more easily pierce and then push through the wall by fitting between the flutes in the wall. In other words, by orienting the long axis of the narrow tip to be parallel to the vertical flutes, one can reduce the resistance that wall usually presents to being pierced by an object.

As the wedge-shaped nozzle pushes through the wall, the sloping sidewalls 234a and 234b, which form a wedge, widen the hole that is formed. As the nozzle penetrates deeper into the box, shoulders 242a and 242b will eventually contact the wall of the box and push the cardboard away from the side air injection holes. That is, the shoulders act to push open flaps that are cut into the wall by the wedge as it penetrates the wall. Gasket 228, which is affixed to inflator cup 220, eventually contacts the outside of the box and stops the further penetration of the inflator into the box. Besides acting as a stop, gasket 228 comes to rest against the wall of the box and also functions as a seal preventing air from leaking away from and not filling the inflatable bag that is inside of the box during the subsequent inflation operation. In the described embodiment, the gasket is made of a plastic material referred to as Poron™ which has a slippery skin covering and a good spring constant causing it to return to its original shape after compression against the box.

After gasket 228 has contacted the outside wall of the container, the system injects air through nozzle 230 which is now inside of the valve assembly within box. The injected air exits from the nozzle through the four holes to generate four distinct air streams distributed relatively evenly around the nozzle. As should be apparent, one advantage of using multiple holes is that if the wall material of the box unexpectedly blocks a hole as a result of the piercing operation, there will still be other alternative pathways for the air to enter the inflatable bag. An advantage of using the side directed air streams is that they tend to open up the valve assembly and passageway through which air flows into the inflatable bag.

Also mounted in bracket 270 there is a linear displacement transducer 268 that is used to directly measure the expansion of the side of the box during inflation of the bag inside of the box. A second linear displacement transducer 269 is mounted between cylinder 222 and the housing of the inflator assembly 200 near the back end of the cylinder. This second linear displacement transducer 269 is used to indirectly measure the upward expansion of the top of the box during inflation. The control system is programmed to compute the upward expansion of the box from the output of transducer 269 and to use both the computed upward expansion and the side expansion to determine when inflation is complete based. It does this in a manner that is similar to that used by the inflation control mechanism described in the previously mentioned patent application U.S. Ser. No. 09/140,522, entitled "Inflatable Packing Material and Inflation System".

It should be noted that second transducer 269 actually measures an amount by which cylinder 222 rotates about the pivot in support bracket 260. While the box is being inflated, its top will expand and since the nozzle is held within the hole punched in the side of the box the distance between the taping head and the nozzle will increase. This causes the cylinder to rotate downward about the pivot point on bracket 260.

Figure 10:
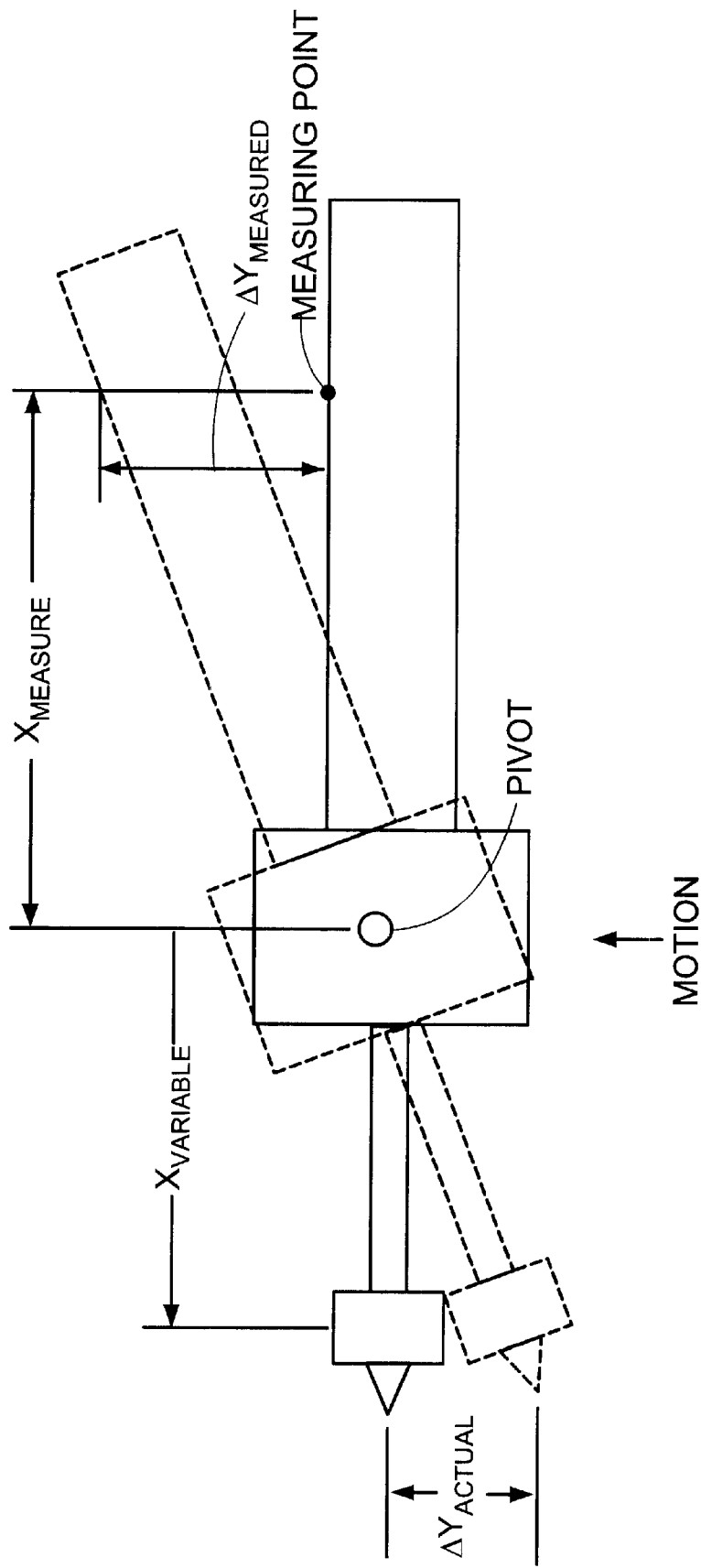
FIG. 10 illustrates how the linear displacement transducer is used to measure box height expansion during inflation.

A program in the control system converts the measurement from transducer 269 to the actual increase in the height of the top of box relative to the inflation hole in the side of the box. The computation that is performed by the processor within the control system is illustrated by FIG. 10. The rise in the back of the cylinder (i.e., $\Delta Y_{measured}$) is related to the drop in the tip of the nozzle (i.e., $\Delta Y_{actual}$) through a very simple relationship, namely:

$$\Delta Y_{actual} = \Delta Y_{measured}(X_{variable}/X_{measured})$$

The variables $X_{measured}$ is the distance between transducer 269 and the point about which cylinder 222 pivots. This is a fixed distance. In contrast, $X_{variable}$ is the distance between that pivot point and the side of the box. This distance varies depending on the size of the box that is in the system. The first transducer 268 provides a measure of this variable distance.

After determining the overall dimensions of the box (e.g. from transducer 268 and another device or transducer that indicates the height of the taping head above the conveyor), the control system then determines from a stored chart of empirically determined swell limits what the appropriate swell limit ($\Delta Y_{limit}$) is for a box of those dimensions. This swell limit is used as a threshold to detect when inflation is complete. It also uses the output of transducer 268 and a known reference distance to calculate $X_{variable}$ and, from that, it calculates ($X_{variable}/X_{measured}$), which is equal to the swell factor for the box being inflated. Then, as inflation is occurring, the control system repeatedly measures $\Delta Y_{measured}$ and scales this by the swell factor to determine $\Delta Y_{actual}$. It compares this computed value to $\Delta Y_{limit}$ to determine when inflation is complete (which of course occurs when $\Delta Y_{measured} \geq \Delta Y_{limit}$).

Though we showed a particular way of implementing the inflator head, it should be understood that there are many different modifications that could be used. For example, instead of affixing a gasket to the inflator cup, it could be made smaller and affixed directly to the inflator nozzle, assuming of course that the nozzle and supporting assembly are modified accordingly.

It is possible that the piercing operation and the fill operation could be physically separate. That is the piercing operation could be performed first by one tool. And further down the line, the air fill operation could be performed by another tool that is pushed through the previously formed slit or hole. Still another approach is to first puncture of the tool and wait until later to fill with the same tool which has been allowed to move along the line with the box.

Note that during the beginning of the inflation operation, it is the forward inertia of the injector head that performs the puncturing operation. If the tip of the nozzle is relatively dull, then the nozzle will have to be pushed forward at a faster rate to pierce the wall. On the other hand, if the tip is "sharp" then the speed at which the nozzle is pushed forward need not be as great to pierce the wall. In other words, the precise parameters that are appropriate for the operation of the cylinder will vary depending on the design of the inflation head. Of course, these parameters can easily be determined empirically.

It should be noted that it is possible to pre-punch the boxes at the location where the valve opening will be placed. In that case, the fill tool only needs to supply air to the hole that was previously formed and possibly provide a back seal that stops leakage that might compromise the fill operation. It need not perform the puncturing step. The supply of air may be accomplished with a tool that is inserted through the hole or it could be supplied by one that does not enter the hole but simply forces air though the hole.

In the described embodiment, the inflator system is stationary and the system stops the box so that the inflator system can perform its functions. However, the inflator could also be mounted on tracks that permit it to follows the box, thus allowing the inflation operation to take place while the box is moving. This could be accomplished in the manner described in U.S. Ser. No. 09/140,522, previously mentioned. In that system, the inflator includes an L-shaped bracket that contacts the front of the box when the inflator is activated and holds the box until the inflation operation is completed. Of course, such an L-shaped bracket would not be necessary with the present design since the nozzle will be held within the hole punched in the box and so the box will pull it along as it moves down the conveyor.

Further Alternative Embodiments

Figure 11A:
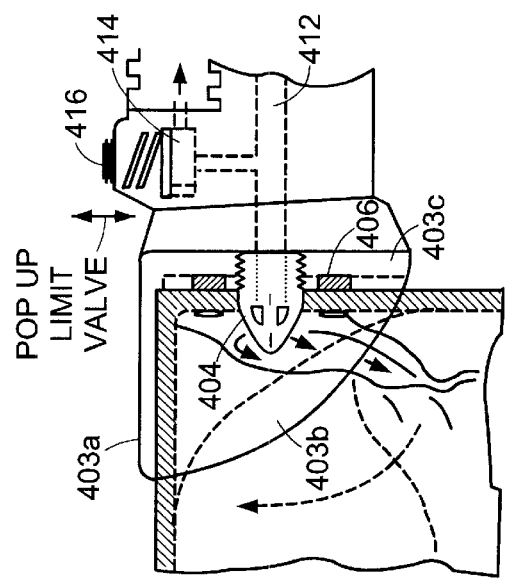
FIG. 11A shows details of certain aspects of the design of the handheld inflation device shown in FIG. 11.
Figure 11:
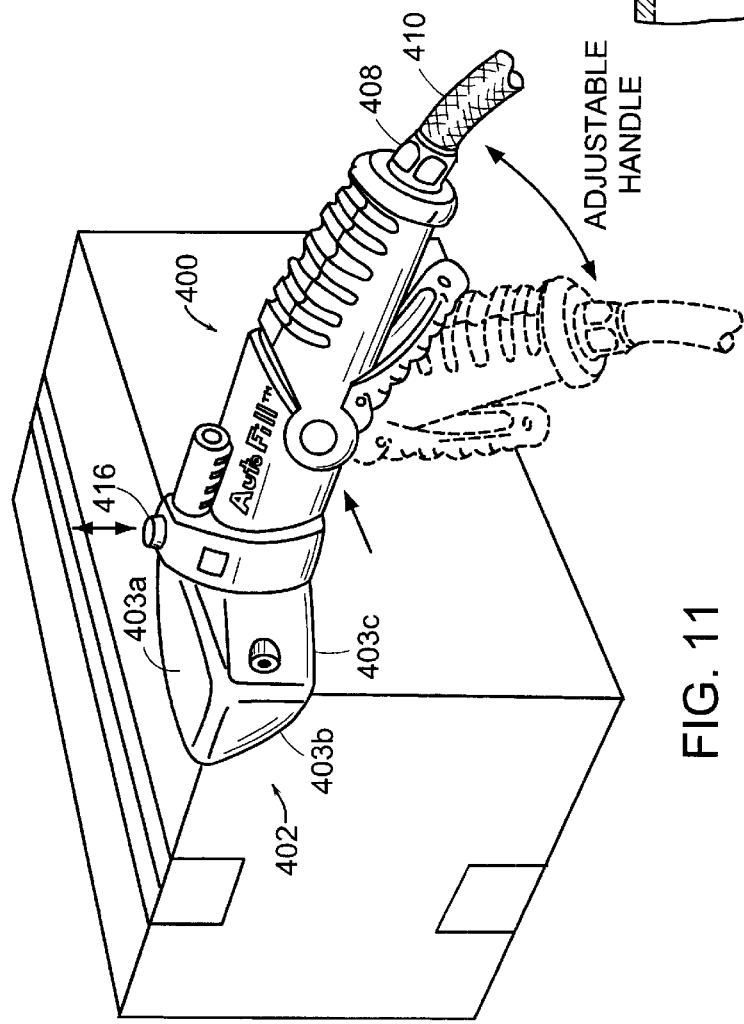
FIG. 11 shows a handheld inflation device that can be used to inflate the inflatable bags described herein.

The injector assembly can also be used as part of a hand held device, which is particularly useful for smaller shop operations or volumes that do not justify the greater expense of a fully integrated machine such as was described above. An example of such a handheld device is presented in FIG. 11. Rather than using an optical detector to properly locate when and where the puncture should be made as described above, the handheld device includes an alignment guide 402. The alignment guide has three wall sections arranged perpendicular to each other to define a corner, namely a top wall section 403a, a side wall section 403b and a back wall section 403c. An injector nozzle 404 is located on back wall section 403c at predetermined distances from top wall and side wall sections 403a and 403b. These distances also define the precise position at which the valve opening needs to be located on the inside of the box. Similar to the automated embodiment described earlier, there is a gasket 406 (see FIG. 11A) that is affixed to the inside of back wall section 403c and circumscribing nozzle 404. At the backend of the handheld device there is a connector 408 for connecting an air supply hose 410 thereto. Inside of the handheld device, there is an internal channel 412 connecting the air hose inlet to nozzle 404. A pop-up limit valve 414 with an external control button 416 controls flow of air through the internal channel into the nozzle.

To use the handheld device, the worker positions the upper left hand corner of the box in the corner that is defined by the three wall sections. When the hand held device is thus aligned, the injection nozzle will also be aligned directly over the spot where the opening of the valve assembly is located inside of the box. The worker then pushes the tool firmly against the box so that the nozzle, which may include a wedge-shaped tip similar to what was described above, punctures the side wall of the box and extends into the opening in the underlying valve assembly. With the nozzle extending into the opening, the worker depresses button 416 on top of the handheld device that opens air valve 414 to inject air into the inflatable bag. As air flows into the bag, the worker feels the top of the box with his hand to determine when the bag is adequately inflated.

Figure 12:
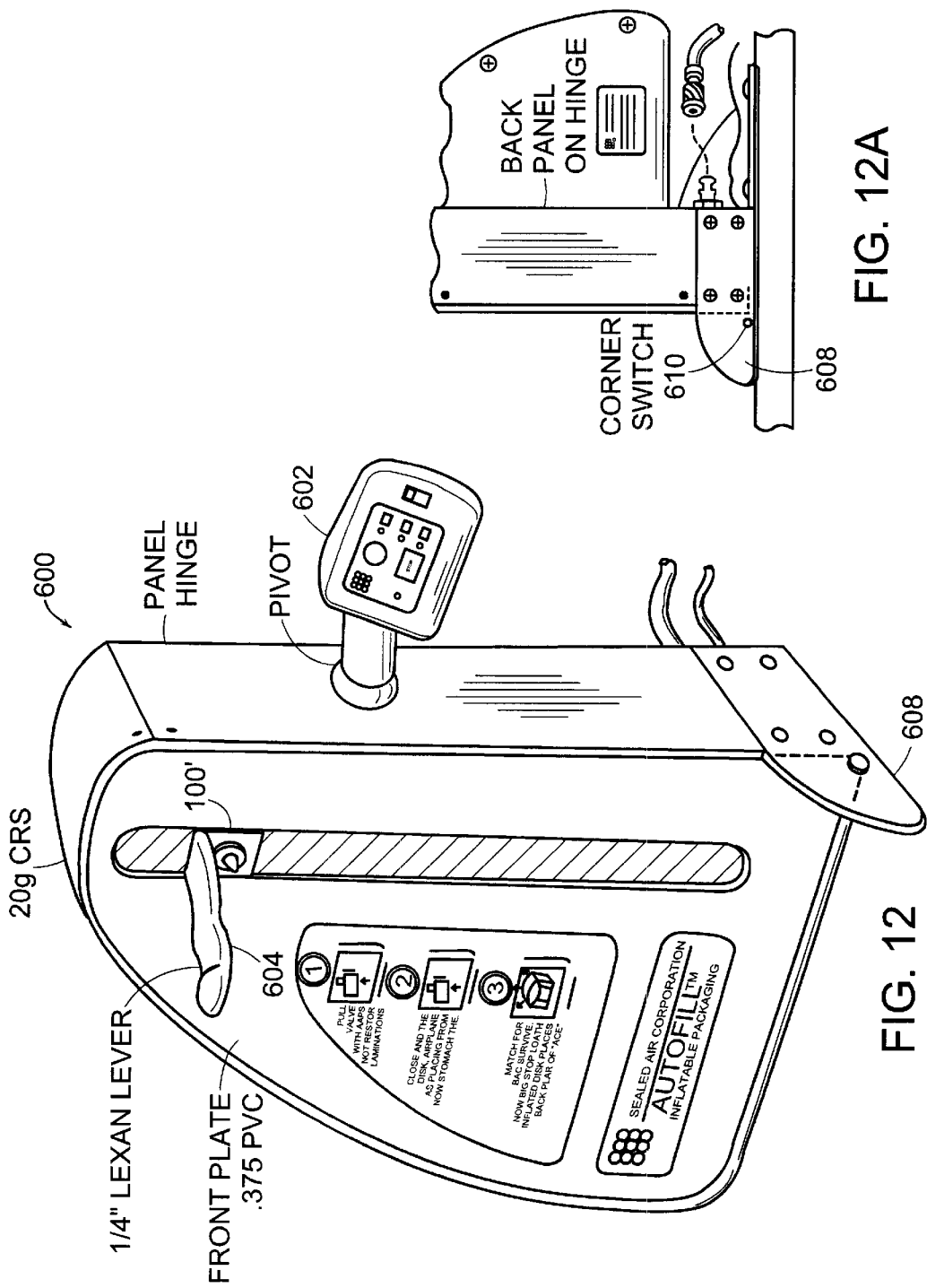
FIG. 12 shows a floor standing inflation unit that can be used to inflate the inflatable bags that are described herein.
Figure 13:
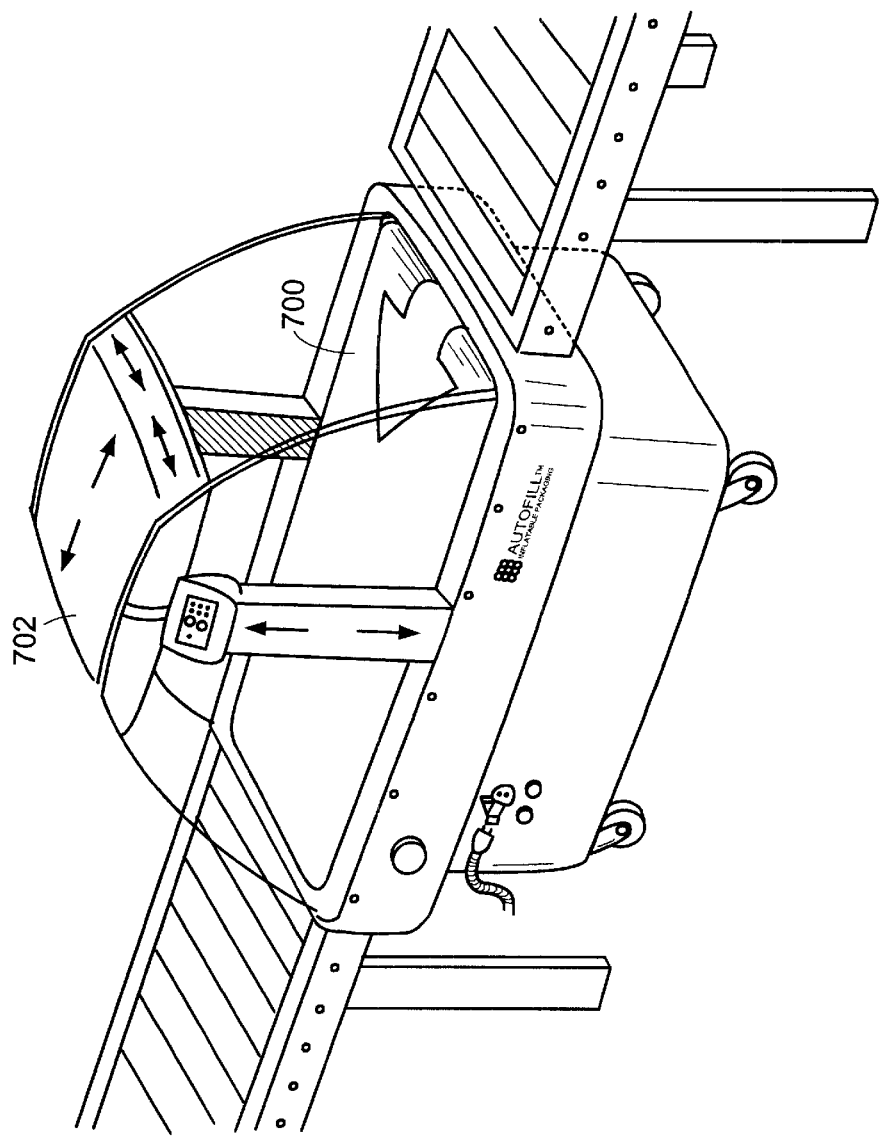
FIG. 13 shows another embodiment of a floor standing inflation unit.

Still other embodiments are shown in FIGS. 12 and 13. FIG. 12 shows a portable standalone unit 600. The unit has a control console 602 for operating it, a motor-operated arm 604 that extends out from the face of the unit and moves up and down in an opening in the face of the unit, and an air injector assembly 606 mounted beneath the arm 604. At the bottom of the unit, there is a guide plate 608 that is attached to the side of the unit extends out beyond the front of the unit. The face of the unit and the guide plate forms a corner into which a box is pushed to achieve proper alignment proper for the inflation operation. When the box is aligned within that corner, the injector nozzle on the inflator assembly will be aligned with the opening on the flexible valve assembly that was attached to the inside wall of the box. There is a switch 610 located in the corner (see FIG. 12A). Proper alignment of the box in the corner defined in part by alignment guide 608 and the front of the unit activates switch 610 which, in turn, causes the unit to lower arm 604 until in contacts the top of the box. When the arm contacts the top of the box, the unit pushes the inflator nozzle into the side of the box until it punctures the box and then it flows air through the nozzle to inflate the bag within the box.

Figure 13A:
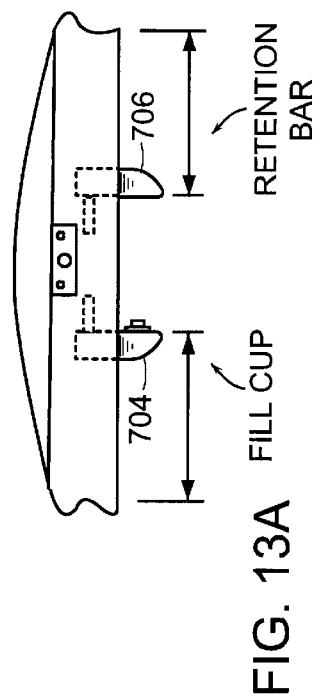
FIG. 13A shows details of certain aspects of the design of the unit shown in FIG. 13.

The unit of FIG. 13 is an automated inflation unit similar in capabilities to those which the system of FIG. 6 possesses, except that it is not integrated with a taping machine. It includes a conveyor 700 that moves the box (not shown) through the unit. The top platform 702 of the unit moves up and down to accommodate the height of the box. On the underside of the top platform 702, there is an inflator nozzle mechanism 704 and an opposed stop member 706 mounted so as to move toward each other an grasp the sides of the box (see FIG. 13A).

Other embodiments are within the scope of the following claims. For example, the valve assembly need not have an oblong-shaped hole. The hole can have any convenient shape. Indeed, in some embodiments, as indicated above, there is no precut hole in the valve assembly rather it is formed during the inflation operation. In addition, it may not be necessary to have a gasket in other embodiments.

What is claimed is:

1. An inflatable packing article comprising:

a flexible, air tight bag; and a valve assembly connected to the bag and defining an internal passage through which air is introduced into the bag during inflation, said valve assembly having an inlet end located outside of the bag, said inlet end having an outer exposed surface region of said inlet end with an adhesive adhered thereto and circumscribing a predefined area of outer exposed surface region through which access to the passage is obtained during an inflation operation.

2. The inflatable packing article of claim 1 wherein the adhesive is distributed around the predefined area in a continuous line.

3. The inflatable packing article of claim 1 wherein the adhesive is distributed around the predefined area in a discontinuous manner.

4. The inflatable packing article of claim 1 further comprising a release material covering and protecting the adhesive.

5. The inflatable packing article of claim 1 wherein the predefined area of the outer exposed surface region has a hole formed therein, said hole providing access into said internal passage and wherein the adhesive circumscribes the hole.

6. The inflatable packing article of claim 1 wherein the valve assembly includes a flexible valve which allows air into the bag during inflation and prevents air from escaping from the bag when the bag is inflated.

7. The inflatable packing article of claim 1 wherein the valve assembly includes no orifice into the internal passage from the outside of the bag.

8. The inflatable packing article of claim 1 wherein the valve assembly is made of a flexible material.

9. The inflatable packing article of claim 8 wherein the flexible material is a polyethylene material.

10. The inflatable packing article of claim 9 wherein the flexible material is a low-density polyethylene material.

11. The inflatable packing article of claim 10 wherein the flexible material is a linear, low-density polyethylene material.

12. The inflatable packing article of claim 1 wherein the flexible airtight bag is made of a flexible plastic material.

13. The inflatable packing article of claim 1 wherein the valve assembly extends out of one end of the bag and wherein the inlet end of the valve assembly is in the form of a tether.

14. The inflatable packing article of claim 1 wherein the bag has an outer wall and wherein a part of the valve assembly is formed by a portion of the wall of the bag.

15. The inflatable packing article of claim 1 wherein the bag has an outer wall a portion of which forms part of the inlet end of the valve assembly and includes a hole, said hole providing access into the internal passage of the valve assembly, and wherein the adhesive is applied to the outside of the outer wall portion and around the hole formed therein.

16. The inflatable packing article of claim 15 wherein the valve assembly, except for said portion of said outer wall, is completely inside of the bag.

* * * * *

UNITED STATES PATENT AND TRADEMARK OFFICE
CERTIFICATE OF CORRECTION

PATENT NO.    : 6,561,236 B1
DATED         : May 13, 2003
INVENTOR(S)   : Laurence B. Sperry, Eric A. Kane and Jesse S. Drake It is certified that error appears in the above-identified patent and that said Letters Patent is hereby corrected as shown below:

<u>Column 13,</u>
Line 7, "area of outer exposed surface" should be -- area of said outer exposed surface --.
Line 30, "from the outside of the bag" should be -- from outside of the bag --.

Signed and Sealed this

Twenty-sixth Day of August, 2003

JAMES E. ROGAN
*Director of the United States Patent and Trademark Office*